United States Patent [19]
Rege et al.

[11] Patent Number: 5,390,299
[45] Date of Patent: Feb. 14, 1995

[54] SYSTEM FOR USING THREE DIFFERENT METHODS TO REPORT BUFFER MEMORY OCCUPANCY INFORMATION REGARDING FULLNESS-RELATED AND/OR PACKET DISCARD-RELATED INFORMATION

[75] Inventors: Satish L. Rege, Groton; Kadangode K. Ramakrishnan, Maynard, both of Mass.; David A. Gagne, Goffstown, N.H.

[73] Assignee: Digital Equipment Corporation, Maynard, Mass.

[21] Appl. No.: 814,998

[22] Filed: Dec. 27, 1991

[51] Int. Cl.$^6$ .................... G06F 13/42; G06F 12/00
[52] U.S. Cl. .................... 395/250; 395/200; 364/239.6; 364/260.2; 364/264.5; 364/DIG. 1; 370/60; 370/94.1
[58] Field of Search .................... 395/250, 425, 200; 370/55, 84, 94, 60, 94.1; 364/200

[56] References Cited

U.S. PATENT DOCUMENTS

| | | | |
|---|---|---|---|
| 3,919,483 | 11/1975 | Gindi et al. | 179/15 AL |
| 4,343,469 | 8/1982 | Kunita et al. | 273/185 A |
| 4,449,182 | 5/1984 | Rubinson et al. | 364/200 |
| 4,663,706 | 5/1987 | Allen et al. | 364/200 |
| 4,833,592 | 5/1989 | Yamanaka | 364/138 |
| 4,849,968 | 7/1989 | Turner | 370/94 |
| 4,866,704 | 9/1989 | Bergman | 370/84.5 |
| 4,920,534 | 4/1990 | Adelmann et al. | 370/94.1 |
| 4,953,157 | 8/1990 | Franklin et al. | 370/60 |
| 4,985,890 | 1/1991 | Matsumoto et al. | 370/94.1 |
| 5,020,020 | 5/1991 | Pomfret et al. | 364/900 |
| 5,058,109 | 10/1991 | Goldberg et al. | 370/85.13 |
| 5,185,736 | 2/1993 | Tyrrell et al. | 370/55 |
| 5,210,829 | 5/1993 | Bitner | 395/250 |
| 5,317,570 | 5/1994 | Ochiai | 370/94.1 |

OTHER PUBLICATIONS

K. K. Ramakrishnan and Raj Jain, "A Binary Feedback Scheme for Congestion Avoidance in Computer Networks", ACM Transactions on Computer Systems, vol. 8, No. 2, May 1990, pp. 158–181.

Tanenbaum, *Computer Networks*, 2nd ed., ch. 5 pp. 309–315 (Prentice Hall, 1988).

Pending U.S. patent application Ser. No. 07/184,945, filed Apr. 22, 1988, Inventor: Jain, et al., Title: "Congestion Avoidance in Computer Networks", Attorney Docket No. PD88–0059.

*Primary Examiner*—Thomas C. Lee
*Attorney, Agent, or Firm*—Ronald C. Hudgens; Barry N. Young; Albert P. Cefalo

[57] ABSTRACT

In a network adapter for a host computer, the data occupancy level of a buffer memory used to store network packets is monitored, and the occupancy level is reported to the host. The buffer memory is organized as a plurality of fixed-size pages. A memory controller uses an allocation counter to track the number of pages available to store incoming data packets, and the value of the allocation counter is compared with a programmable threshold. A data word accompanies each packet delivered to the host to indicate whether the allocation count exceeds the threshold. When the buffer memory has insufficient free space to store an incoming packet, the packet is discarded. The network adapter keeps a count of the number of discarded packets. An adapter manager microprocessor, which is part of the network adapter, reports the count to the host computer on request. The adapter manager also reports the value of the allocation count and other important network adapter variables to the host computer.

15 Claims, 10 Drawing Sheets

ADAPTER MANAGER VARIABLES

DISCARD - RELATED
- PACKET DISCARDED
- INTERRUPT ON DISCARD
- NUMBER DISCARDED
- DISCARD RATE
- OLD NUMBER DISCARDED

FULLNESS - RELATED
- MAX ALLOCATED
- ALLOCATION COUNT
- AVERAGE ALLOCATION COUNT
- INSTANTANEOUS THRESHOLD
- AVERAGE THRESHOLD
- AVERAGE THRESHOLD EXCEEDED
- CUR CY SA [0:N]
- PREV CY SA [0:N]
- CUR CY SA PTR
- BUSY

SYSTEM FOR USING THREE DIFFERENT METHODS TO REPORT BUFFER MEMORY OCCUPANCY INFORMATION REGARDING FULLNESS-RELATED AND/OR PACKET DISCARD-RELATED INFORMATION

FIELD OF THE INVENTION

This invention relates to a communication interface adapter employing buffer memory in the transfer of data packets between a data network and a host computer.

BACKGROUND OF THE INVENTION

In computer networks, host computers communicate with each other by exchanging data packets over the network. Packets are sometimes lost, or discarded, somewhere in the network. Packet loss in a network is undesirable; it can cause unreliable program execution or, in some cases, network-wide problems with severe consequences. Therefore, network design should minimize packet loss.

Under various circumstances, it is possible for the network to become congested. Congestion refers to the fullness of buffers in network devices, such as bridges and routers. When the network is congested, it is more likely for packets to get lost due to lack of buffer space in network devices. Therefore, to minimize packet loss, network congestion should be avoided.

Networks have employed congestion control schemes to recover from congestion and to avoid congestion if possible. In these schemes, network devices, such as bridges and routers, provide congestion information to host computers in the network. In response to the congestion information, host computers take steps to reduce congestion, including increasing the amount of buffering in host memory and reducing the network loading. One way of reducing network loading to decrease the number of unacknowledged packets that are allowed on the network at a time. These techniques are described in chapter 5 of *Computer Networks*, 2nd ed., by Tanenbaum (Prentice Hall, 1988), and in *"A Binary Feedback Scheme for Congestion Avoidance in Computer Networks"* by K. K. Ramakrishnan and Raj Jain, ACM Transactions on Computer Systems, Vol. 8, No. 2, May 1991.

As network speeds have increased, the likelihood of buffer memory congestion on the host network adapter has also increased. This is because packet delivery times on the network have decreased markedly, but the time required to store a packet in host memory has not decreased commensurately. Therefore packets received from the network can begin to "pile up" in the buffer memory on the adapter. Current congestion control schemes do not detect adapter buffer memory congestion, and therefore do not effectively control or avoid packet loss that arises from it. It is desirable to minimize packet loss that arises from buffer memory congestion in the host network adapter.

SUMMARY OF THE INVENTION

In accordance with the principles of the present invention, there is a host network adapter that provides buffer memory occupancy information to a host computer to enable the host to control and avoid receive-side buffer memory congestion. In one embodiment, the adapter comprises a packet buffer memory, divided into pages, which is coupled to the network and to a host data bus within the host computer. The adapter has means for monitoring the occupancy of packet buffer memory. It detects the following conditions or events related to packet buffer memory congestion:

- the number of "full" pages—i.e., pages containing receive packet data that has not been delivered to the host
- the average number of full pages over a recent interval
- when the number of full pages exceeds a predetermined instantaneous threshold
- when the average number of full pages exceeds a predetermined average threshold
- overflow, i.e., when a packet is discarded due to lack of free pages
- the rate at which packets are being discarded
- the rate of change of the packet discard rate The adapter also has means for reporting the packet buffer memory occupancy information to a CPU in the host computer, using three methods. In one method, the adapter constructs an unsolicited message in host memory that provides the occupancy information to the host. In the second method, the CPU issues a command to the adapter, and the adapter responds to the command by returning the occupancy information. In the third method, the adapter provides occupancy information along with a packet that is delivered to the host.

BRIEF DESCRIPTION OF THE DRAWINGS

An embodiment of the invention will be described with reference to the accompanying drawings, in which:

FIG. 5 is updated;

FIG. 5 is updated;

FIG. 5 is updated;

FIG. 5 is updated;

FIG. 5 is done;

DESCRIPTION OF THE PREFERRED EMBODIMENT

Figure 1:
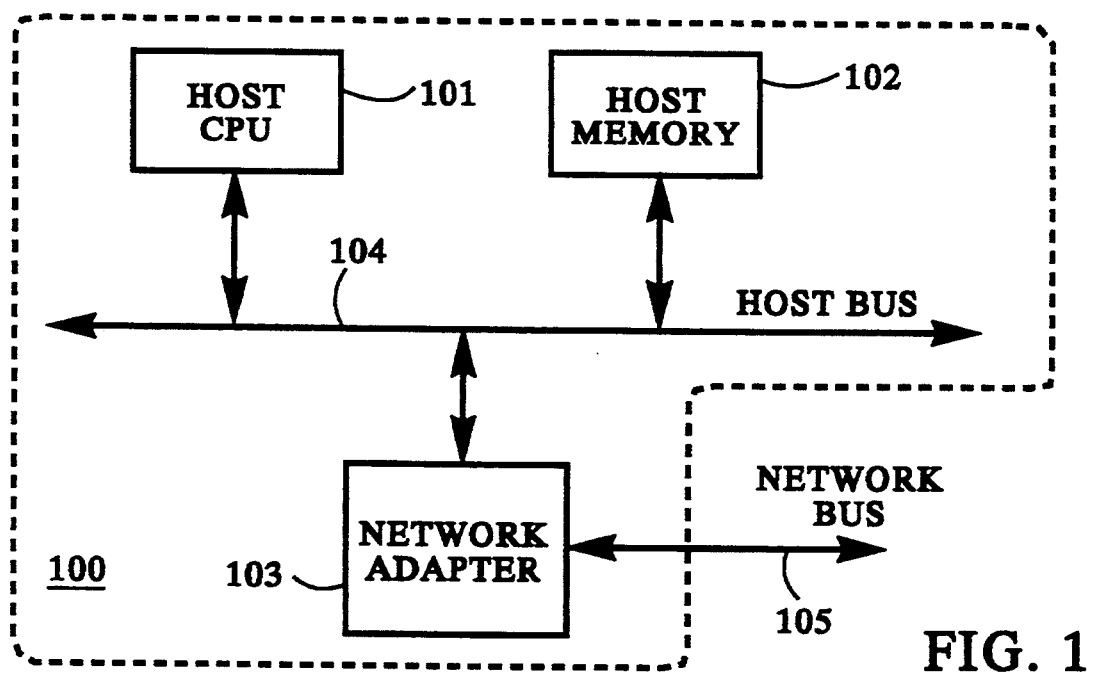
FIG. 1 is a block diagram of a host computer connected to a network via a network adapter, according to the invention.

Congestion control (also termed recovery) is usually involved in bringing back the operation of the network to a stable point after it has reached severe overload and has potentially lost one or more packets. Congestion avoidance, on the other hand, is to prevent the build up of congestion in the network. Typically, the intermediate systems (also called routers) and the host CPU cooperate in achieving an acceptable congestion control and avoidance strategy.

Congestion information is normally collected by intermediate systems. The adapter/network interface of a computer is generally not included as an active participant in the congestion avoidance and control algorithms used in a computer network. As network speeds increase substantially compared to the speed of processing in the host, the network adapter may also become congested. This invention is to include the host-network adapter in the process of detecting and providing information on its state of congestion to the host CPU. The host CPU then has higher level congestion avoidance and control functions that include adapter information in their algorithms.

There are two parts to the invention
(a) for the adapter to detect congestion in the adapter; and
(b) for the adapter to communicate its congestion information to the host.

Detection of Congestion

There are several parts to the detection of congestion by the adapter. Inside the adapter, the detection of congestion is done in the following ways:
  identifying if the buffers in the adapter are full—this relates to congestion control/recovery;
  identifying if there is overflow from the buffers in the adapter;
  further identifying the rate at which the buffers in the adapter are overflowing. This is measured in terms of the number of packets being lost successively or the total number of packets lost since the last epoch (or last indication);
  identifying if the buffers in the adapter are partially full—this relates to congestion avoidance, which is more anticipatory in nature; and
  as a further enhancement of the congestion avoidance, in order to avoid premature indication of congestion because of transient overload, a means for determining the average buffer occupancy over a time interval. This time interval may be a fixed amount of time or adaptive to the behavior of the received traffic.

There are several methods that the adapter can use to indicate congestion to the host CPU. The adapter may use different methods for congestion control and congestion avoidance.

Congestion control/recovery indication methods:
  interrupt the host CPU on buffer overflow.
  through a message to the host CPU on buffer overflow.
  periodically indicate to the host CPU if buffer overflow occurred during the last epoch (if indications are at the expiration of a timer) via one of the above two mechanisms.
  periodically indicate to the host CPU the number of packets lost during the last epoch.

Congestion avoidance indication methods:
  on the buffer occupancy reaching a threshold, indicate to the CPU on each packet, the level of congestion:
    + instantaneous occupancy in the adapter buffers;
    + average occupancy in the adapter buffers;
    + indicate via just a bit whether or not the instantaneous or average occupancy has crossed a threshold that is set a priori (at initialization)
  periodically indicate to host of congestion through the unsolicited ring
    + average buffer occupancy during the last epoch
    + maximum buffer occupancy during the last epoch In the drawings, there appear many shortened signal names. As an aid, the following table shows the full functional name of these signals, some of which are multi-bit signals.

| SIGNAL NAME | Function |
|---|---|
| NET RX DONE | Network interface receive done |
| HOST XMT DONE | Host bus interface transmit done |
| PMC RX DONE | Packet memory controller receive done |
| MCTL BUS | Memory controller bus; e.g., 32 bits |
| INT | Interrupt |
| ALLOC CNT | Allocation count; e.g., 32 bits |
| UP | Increment allocation counter |
| DOWN | Decrement allocation counter |
| WR ALLOC | Write to the allocation counter |
| DISC CNT | Value in the discard counter; e.g., 32 bits |
| CLR DISC | Clear discard counter |
| INC DISC | Increment discard counter |
| WR FDET | Write to the fullness detector |
| D OUT | Data output from PMC interface logic; e.g., 32 bits |
| AVG THR | Average threshold exceeded |
| INST THR | Instantaneous threshold exceeded |
| WR MASK | Write interrupt mask register |
| DISC INT | Discard counter interrupt |
| INT STAT | Interrupt status; e.g., 2 bits |

FIG. 1 is a block diagram of a host computer connected to a network bus via a network adapter. The elements shown in FIG. 1 implement a network "node" 100. The node 100 comprises a host central processing unit or CPU 101, host memory 102, and network adapter 103. The CPU 101 and network adapter 103 communicate with host memory 102 and each other via a host bus 104, which is a parallel data bus. The adapter 103 is also connected to the network bus 105. In this embodiment, the network bus 105 is an optical fiber in conformance with the Fiber Distributed Data Interface (FDDI) physical layer specification. In a typical network configuration, the network bus 105 is connected to several nodes, and the nodes communicate with each other by passing data over the network bus 105 in the form of optical signals.

To communicate with other nodes on the network, the node 100 transmits and receives data packets that travel serially on the network bus 105. When the node 100 is transmitting, the CPU 101 stores data for transmission in memory 102 and informs the adapter 103 that there is a packet of data in memory 102 to be transmitted on the network bus 105. The adapter 103 reads the packet from memory 102 and transmits it as a serial data stream over the network bus 105. Within the packet is the address of the destination node on the network.

When the node 100 is receiving, the adapter 103 receives the packet and examines the destination address and other attributes present in the packet header to determine if the packet is destined for the receiving node 100. If so, the adapter 103 stores the packet in host memory 102. After storing the packet, the adapter informs the CPU 101 that a packet has been received. The CPU 101 is then free to read the data within that packet. In response to the receipt of a packet, the CPU 101 may (depending on the network protocol) assemble an acknowledgement packet in the host memory 102. The acknowledgement packet is sent back to the node that transmitted the original packet, to inform that node that the packet was received correctly.

In addition to network send and receive traffic, there are two additional communication mechanisms between the CPU 101 and the adapter 103. The CPU 101 may read and write adapter control and status registers (known as CSRs) over the host bus 104. Accessing the CSRs allows the CPU 101 to control and monitor the operation of the adapter 103. In the case of CSR reads, the adapter 103 returns the CSR data to the CPU 101 over the host bus 104. In the case of CSR writes, the adapter 103 stores the write data in the CSR that corresponds to the write address. The adapter 103 also generates interrupts on the host bus 104 under some circumstances; these interrupt the CPU 101, which responds by reading a CSR on the adapter 103 to ascertain the cause of the interrupt.

The adapter 103 also accesses host memory 102 directly as yet another way to communicate with the CPU 101. The CPU 101 can pass command messages to the adapter 103 through host memory 102; and the adapter can store adapter-generated messages in host memory 102 that contain information about the adapter or the network. The CPU 101 can then read the messages from host memory 102. The adapter-generated messages may be either in response to a command from the CPU 101, or unsolicited messages from the adapter 103 to the CPU 101.

Figure 2:
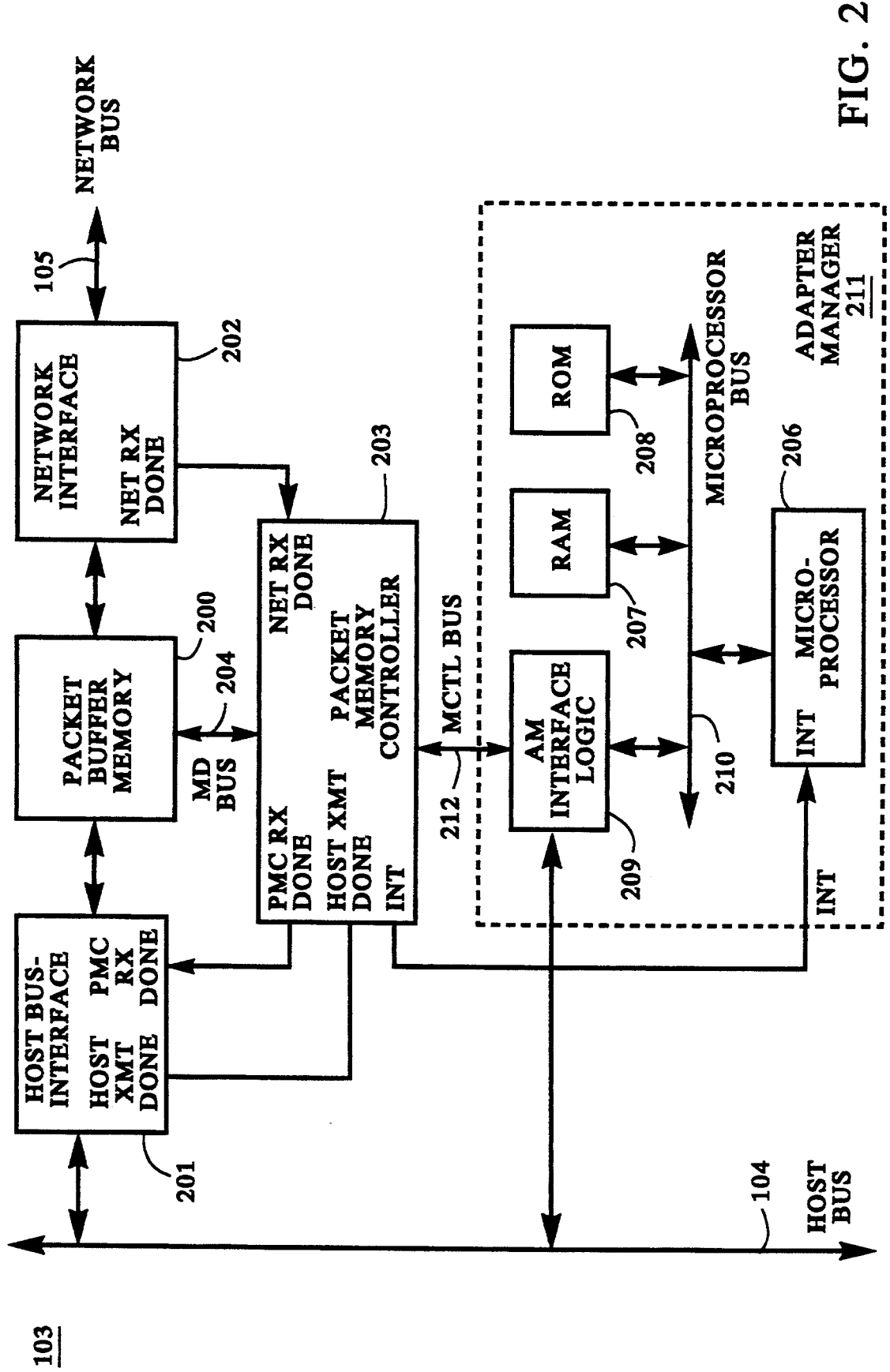
FIG. 2 is a block diagram of the network adapter of FIG. 1.

FIG. 2 is a block diagram illustrating the configuration of the network adapter 103 in more detail. There is a packet buffer memory 200 which is coupled to the host bus 104 FIG. 1 by a host bus interface 201, and which is also coupled to the network bus 105 FIG. 1 by a network interface 202. The packet buffer memory 200 is also coupled to a packet memory controller 203 via the memory data (MD) bus 204.

Also shown in FIG. 2 is a microprocessing system having a microprocessor 206, random-access memory (RAM) 207, read-only memory (ROM) 208, and adapter manager (AM) interface logic 209, all connected to a microprocessor bus 210. This microprocessing system is called the adapter manager 211. The adapter manager 211 executes a firmware program from ROM 208 that works with adapter hardware to perform some adapter tasks, such as FDDI-related functions, diagnostics, initialization, and adapter statistics gathering. The AM interface logic 209 is coupled to the memory controller 203 by the memory controller (MCTL) bus 212. The MCTL bus interconnection is functional. The datapath between the AM interface logic 209 and the memory controller need not be direct; it may, for example, go indirectly through the host bus interface block 201. The AM interface logic 209 is also coupled to the host bus 104 FIG. 1. Additionally, the memory controller 203 has an interrupt output signal terminal INT that is coupled to the interrupt input signal terminal INT of the microprocessor 206.

In FIG. 2, there are several control signals whose connections will now be described. The network interface 202 has an output signal terminal NET RX DONE that is coupled to the NET RX DONE input signal terminal of the memory controller 203. The host bus interface 201 has an output signal terminal HOST XMT DONE that is coupled to the HOST XMT DONE signal terminal of the memory controller 203. The output signal terminal PMC RX DONE of the memory controller 203 is coupled to the input signal terminal PMC RX DONE of the host bus interface 201.

Figure 3:
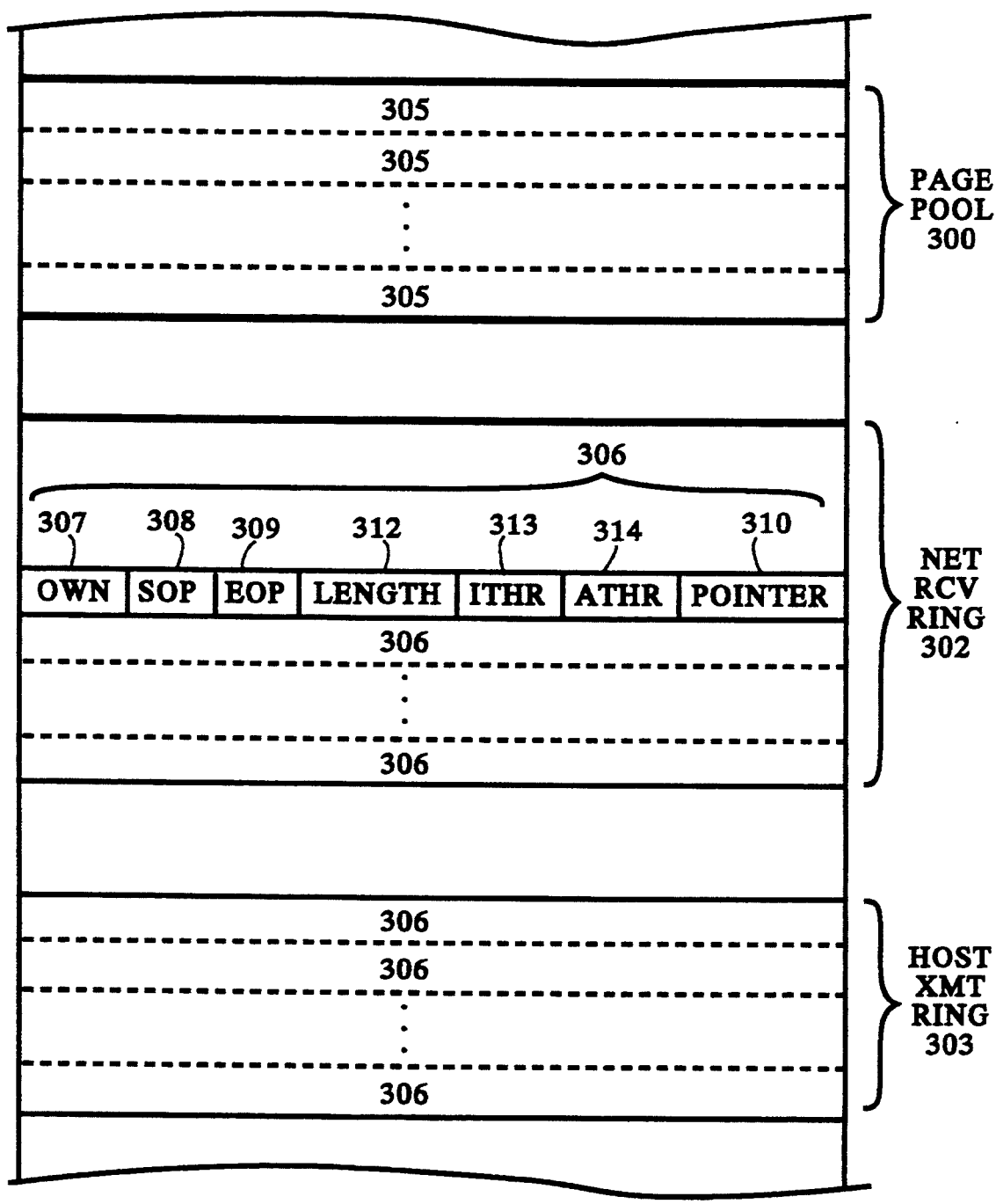
FIG. 3 shows part of the organization of the packet buffer memory in the adapter FIG. 1.

Before the operation of the adapter is described, the organization of the packet buffer memory 200 is described with reference to FIG. 3. FIG. 3 shows a section of packet buffer memory 200 containing a pool of pages 300, a NET RCV ring 302, and a HOST XMT ring 303. The pool of pages 300 is an array of pages 305, which are, by way of example, 512 bytes large. A page 305 is the smallest unit of buffering for packets, so that packets smaller than 512 bytes are stored in one page 305, packets between 512 and 1024 bytes are stored in two pages 305, etc.

The pages 300 are used for packet data buffering, while the NET RCV ring 302 and HOST XMT ring 303 are shared data structures that the adapter uses to manage the pages 300 as they are used to move packet data from the network to the host. The NET RCV ring 302 and HOST XMT ring 303 are circular lists of ring entries 306. Each ring entry 306 contains an "ownership" (OWN) bit 307, a "start of packet" (SOP) bit 308, an "end of packet" (EOP) bit 309, a "pointer" 310, a length field 312, an "instantaneous threshold exceeded" (ITHR) bit 313, and an "average threshold exceeded" (ATHR) bit 314. The pointer 310 is the starting address of one page 305 that contains packet data. The NET RCV ring 302 is shared by the network interface 202 and the packet memory controller 203, and the HOST XMT ring 303 is shared by the packet memory controller 203 and the host bus interface 201.

The length field 312 indicates the length of the packet in bytes. On multi-page packets (packets whose length exceeds 512 bytes), only the length field 312 of the first page in the packet is valid. The ITHR bit 313 indicates whether the instantaneous occupancy of the pages 305 exceeds a predetermined threshold. Similarly, the ATHR bit 314 indicates whether the average occupancy of the pages 305 exceeds a predetermined average threshold.

The operation of the adapter 103 when receiving network packets will, now be described with reference to FIGS. 2 and 3. Prior to the arrival of the packet at the adapter, there are sufficient free pages 300 of packet buffer memory 200 to at least temporarily store the packet, and also sufficient entries in the NET RCV ring 302. The OWN bit 307 in these free ring entries indicates that the network interface 202 owns the ring entry. Therefore, both the network interface 202 and the memory controller 203 can read the ring entry 306, but only the network interface 202 can modify its contents.

When a packet is received from the network, the network interface 202 converts the serial packet data into parallel data words, and stores the words in the packet buffer memory 200. For each page of data, the network interface 202 writes an entry 306 in the NET RCV ring 302. The packet memory controller 203 has already written each entry 306 with the address of the associated page of packet data. The network interface 202 writes the correct SOP 308 and EOP 309 settings.

SOP 308 is set to 1 on the first page of the packet only; EOP 309 is set to a 1 on the last page of the packet only (note that SOP 308 and EOP 309 are both set to 1 for a one-page packet). For a multi-page packet, the network interface 202 writes the ring entry 306 for the first page last. When the network interface 202 writes the ring entry, it toggles the OWN bit 307, so that the packet memory controller 203 obtains sole access to the ring entry. After all of the packet pages have been stored in this fashion, the network interface 202 notifies the packet memory controller 203 that there is a new packet by asserting the NET RX DONE signal FIG. 2.

In response to the assertion of the NET RX DONE signal, the packet memory controller 203 determines whether to forward the packet to the host or to discard it. The packet memory controller 203 checks that the number of pages in the packet does not exceed the number of pages 305 that may be given to the HOST XMT ring 303 (this process is described in more detail below, in reference to FIG. 4). If the memory controller 203 decides to forward the packet, it copies the pointers 310 in the ring entries 306 from the NET RCV ring 302 to the HOST XMT ring 303. The packet data stays in place in the packet buffer memory 200. As the packet memory controller 203 copies each ring entry 306, it toggles the OWN bit 307 in the ring entry 306 of the HOST XMT ring entry to indicate that the host bus interface 201 owns the ring entry. For multi-page packets, the ring entry 306 that corresponds to the first page 305 is copied last; and the OWN bit 307 of the first page 305 is toggled last. After all of the ring entries 306 have been copied, the packet memory controller 203 informs the host bus interface 201 that there is a new packet in the HOST XMT ring 303 by asserting the PMC RX DONE signal.

In response to the PMC RX DONE signal, the host bus interface 201 then reads the packet data from the packet buffer memory 200 and writes it into the host memory 102 via the host bus 104. After each page has been written to host memory 102, the host bus interface 201 toggles the OWN bit 307 for that page in the HOST XMT ring 303, so that the packet memory controller 203 owns the page. After all the pages in the packet have been delivered to the host, the host bus interface 201 asserts HOST XMT DONE to indicate to the packet memory controller that the pages have been freed. At this point, the packet has been successfully delivered to the host.

After the assertion of the HOST XMT DONE signal, the memory controller 203 returns the freed pages to the NET RCV ring 302, where they can be used to hold another packet. The memory controller 203 accomplishes this by copying the ring entry pointers 310 from the HOST XMT ring 303 to the NET RCV ring 302, and toggling the OWN bit 307 for each page.

In addition to manipulating ring entries, the packet memory controller 203 also cooperates with the adapter manager 211 to monitor the occupancy of the packet buffer memory 200. The packet buffer memory occupancy monitoring logic is shown in FIG. 4.

Figure 4:
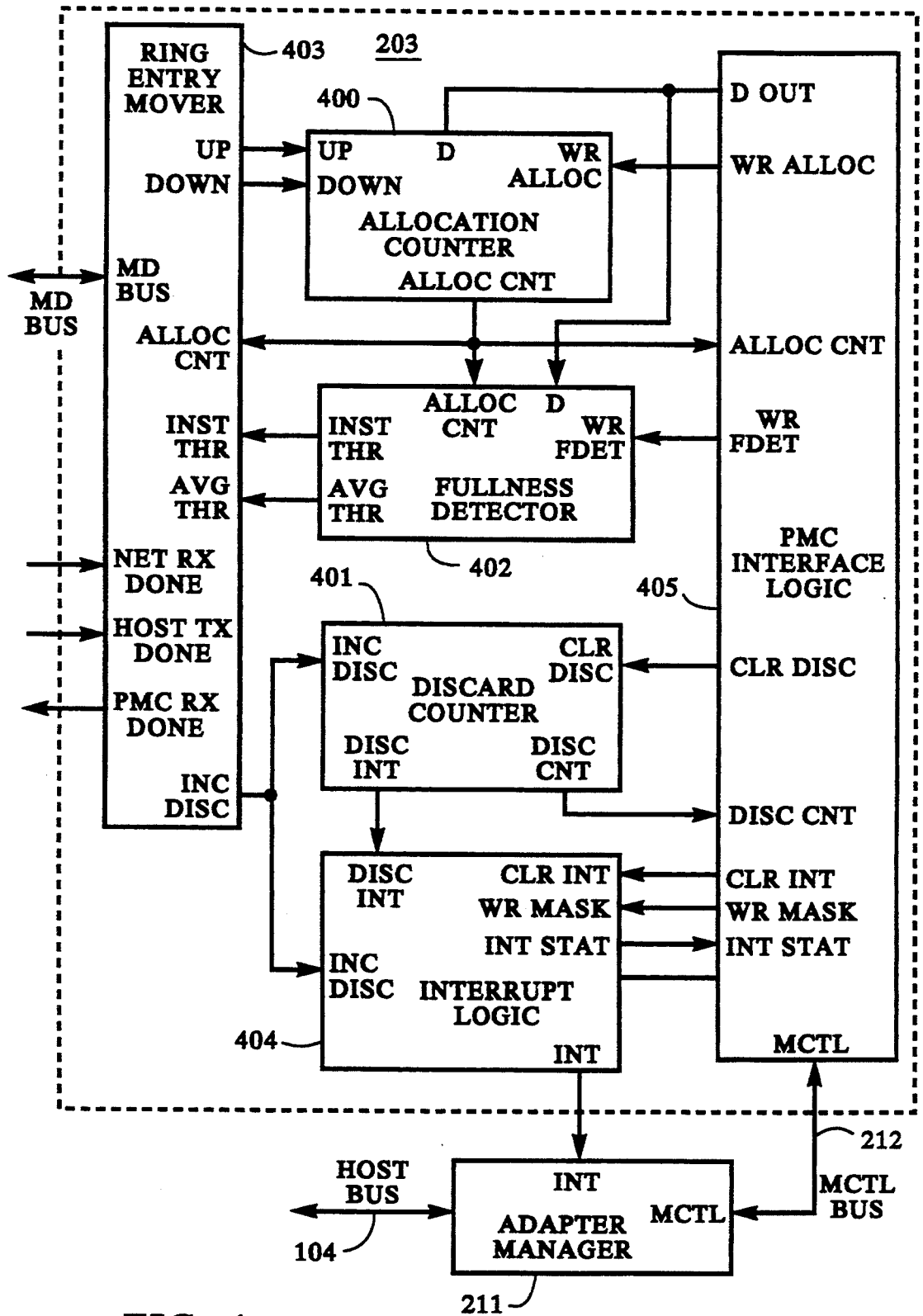
FIG. 4 is a block diagram of the packet buffer memory occupancy monitoring logic, which is part of the adapter of FIG. 1.

FIG. 4 shows the memory controller 203 FIG. 2 in more detail, and also shows the connections between the memory controller 203 and the adapter manager 211. The adapter manager 211 is coupled to the host bus 104 FIG. 1 and also to the bidirectional MCTL bus 212, which enables the adapter manager 211 to communicate with the memory controller 203. The adapter manager 211 also has an input signal terminal INT, which enables the memory controller 203 to interrupt the adapter manager 211. The memory controller 203 comprises an allocation counter 400, a discard counter 401, fullness detector 402, a ring entry mover 403, interrupt logic 404, and PMC interface logic 405.

The allocation counter 400 is a loadable up/down binary counter. It has an input signal terminal D that is coupled to the D OUT signal terminal of the PMC interface logic 405, and an output signal terminal ALLOC CNT that is connected to the ALLOC CNT input signal terminals of the PMC interface logic 405, the fullness detector 402, and the ring entry mover 403. The input signal terminals UP and DOWN of the allocation counter 400 are respectively coupled to the output signal terminals UP and DOWN of the ring entry mover 403. The allocation counter 400 also has an input signal terminal WR ALLOC that is coupled to the WR ALLOC signal terminal of the packet memory controller (PMC) interface logic 405.

The host discard counter 401 is a binary counter. It has output signal terminals DISC CNT, which is coupled to the DISC CNT signal terminal of the PMC interface logic 405, and DISC INT, which is coupled to the DISC INT signal terminal of the interrupt logic 404. It also has input signal terminals CLR DISC, which is coupled to the CLR DISC signal terminal of the PMC interface logic 405, and INC DISC, which is coupled to the INC DISC signal terminal of the ring entry mover 403.

The fullness detector 402 has input signal terminals WR FDET and D that are respectively coupled to the WR FDET and D OUT signal terminals of the PMC interface logic 405. It has output signal terminals AVG THR and INST THR that are coupled respectively to input signal terminals AVG THR and INST THR of the ring entry mover 403.

The ring entry mover 403 is a block of control logic that performs the ring entry manipulation described above, with reference to FIGS. 2 and 3. The input signal terminal NET RX DONE of the ring entry mover 403 is coupled to the NET RX DONE signal terminal of the network interface 202 FIG. 2. The input signal terminal HOST XMT DONE is coupled to the HOST XMT DONE signal terminal of the host bus interface 201 of FIG. 2. The output signal terminal PMC RX DONE is coupled to the PMC RX DONE signal terminal of the host bus interface 201 of FIG. 2. The MD BUS signal terminal is coupled to the MD bus 204 of FIG. 2.

The interrupt logic 404 has an output signal terminal INT STAT that is coupled to the INT STAT input signal terminal of the PMC interface logic 405, and input signal terminals CLR INT, WR MASK, and D that are coupled to the CLR INT, WR MASK, and D OUT output signal terminals of the PMC interface logic 405. There is also an output signal terminal INT that is coupled to the INT signal terminal of the adapter manager 211, and an input signal terminal INC DISC that is coupled to the INC DISC signal terminal of the ring entry mover 403.

In operation, the PMC interface logic 405 provides a means for allowing the adapter manager 211 to access the blocks shown in FIG. 4 over the MCTL bus 212. The PMC interface logic 405 is designed, in a standard fashion, to make the allocation counter 400, fullness detector 402, discard counter 401, and interrupt logic 404 appear to the adapter manager 211 as memory-mapped I/O registers whose contents are accessible under program control. When the adapter manager 211 performs a write operation over the MCTL bus 212, it transfers the write address and the write data in separate cycles. The PMC interface logic 405 decodes the write address to determine whether the destination is the allocation counter 400, the fullness detector 402, or the interrupt logic 404. If the write is for one of those blocks, then during the write data cycle the PMC interface logic 405 transfers the data from the MCTL bus 212 to its D OUT signal terminal and asserts one of the WR ALLOC, WR FDET, or WR MASK signals, thus writing the data into the appropriate block. When the adapter manager 211 performs a read operation, it transfers the read address in one cycle. The PMC interface logic 405 decodes the address to determine which block the adapter manager 211 is reading—the allocation counter 400, the discard counter 401, or the interrupt logic 404. The PMC interface logic 405 then transfers the output of the appropriate block to the MCTL bus 212. Additionally, if the discard counter 401 is being read, the PMC interface logic 405 asserts the CLR DISC signal, which sets the discard counter 401 to zero. Similarly, if the interrupt logic 404 is being read, the PMC interface logic 405 asserts the CLR INT signal, which resets the INT and INT STAT terminals of the interrupt logic 404 to zero.

The allocation counter 400 keeps track of the number of pages of packet buffer memory 200 allocated for network packets that are destined for the CPU 101. During the initialization of the adapter 103, the adapter manager 211 determines what the initial value of the allocation counter 400 should be; this initial value represents the maximum number of pages that may be used for host-destined packet data. It then stores this value in its RAM 207 as the variable MAX ALLOCATED, and also writes the value into the allocation counter 400 over the MCTL bus 212.

The operation of the packet buffer memory occupancy monitoring logic during packet reception will now be described with reference to FIG. 4. After a packet has been stored in the packet buffer memory 200 by the network interface 202 of FIG. 2, the ring entry mover 403 reads the packet length information from the packet buffer memory 200. The packet length is the number of bytes in the packet. The ring entry mover 403 determines the number of pages in the packet by shifting the length to the right by 9 bits. It then compares the number of pages in the packet with the value of ALLOC CNT. If the number of pages in the packet exceeds ALLOC CNT, then the ring entry mover 403 discards the packet. When it discards a packet, the ring entry mover 403 "copies" the NET RCV ring entries back to the NET RCV ring 302, toggling the OWN bits 307 as it does so. This way, the pages can be used by another incoming packet. The ring entry mover 403 signals that it has discarded a packet by asserting the INC DISC signal. The assertion of the INC DISC signal increments the host discard counter 401, and also causes the interrupt logic 404 to assert the adapter manager 211 interrupt signal INT. In response, the adapter manager 211 notifies the CPU 101 using an unsolicited message, as described below in reference to FIG. 14.

If the number of pages in the packet does not exceed the value of ALLOC CNT, then the ring entry mover 403 transfers the packet to the HOST XMT ring 303, as described above in reference to FIGS. 2 and 3. The ring entry mover 403 decrements the allocation counter 400 once for each ring entry that it copies, by asserting DOWN. After the entire packet has been transferred, then, the value of ALLOC CNT has been reduced by the number of pages in the received packet. Thus there are that many fewer pages available for a subsequent packet to use.

After the host bus interface 201 has written the packet into host memory 102, the ring entry mover 403 once again owns the ring entries and pages for that packet. It returns the pages to the NET RCV ring 302 by copying the ring entries 306 from the HOST XMT ring 302 to the NET RCV ring 302, and toggling the OWN bits 307 in the ring entries 306 of the NET RCV ring 302. It also increments the allocation counter 400 once for each ring entry that it copies, by asserting UP. The incrementing reflects the "freeing" of the pages; so that following the delivery of a packet to the CPU 101, the value of ALLOC CNT has been increased by the number of pages in the delivered packet. Thus there are that many more pages of packet buffer memory 200 available for subsequent packets.

As mentioned previously, the ring entry mover 403 increments the discard counter 401 and interrupts the adapter manager 211 when it discards a packet. When the packet discard rate is low, the adapter manager 211 can respond to each interrupt, and in turn notify the CPU 101 that a packet has been discarded. However, when the discard rate is high, the adapter manager 211 does not respond to each discarded packet, because doing so is too time consuming. Instead, the adapter manager 211 disables the discard interrupt (discussed below), and instead relies on the discard counter 401 to count each packet that is discarded. Therefore, the adapter manager 211 can identify the number of discarded packets in a time interval even when the discard rate is high.

When the value of the discard counter 401 exceeds half of its maximum value, it asserts the DISC INT signal, which causes the interrupt logic 404 to assert the INT signal. The DISC INT interrupt is independent of an interrupt caused by INC DISC, which is asserted when a packet is discarded. In response to the interrupt, the adapter manager 211 reads the discard counter 401 to determine the number of packets that have been discarded since the last time the discard counter 401 was cleared. The discard counter 401 is always cleared when it is read, so the count only accumulates between two sequential reads.

In addition to monitoring the cumulative packet discard count, the adapter manager 211 also calculates a packet discard rate. It does this by periodically sampling the discard counter to track the number of packets discarded per unit time. The discard rate calculation is described in more detail below, in reference to FIG. 9.

While the discard counter 401 as described allows the adapter manager 211 to monitor the packet discard rate, the fullness detector 402 and allocation counter 400 allow the adapter manager 211 to monitor the occupancy of packet buffer memory 200. In turn, this monitoring can help the CPU 101 of FIG. 1 to take steps to prevent the packet buffer memory 200 from becoming completely full, and therefore to avoid packet discarding in the first place.

In operation, the fullness detector 402 compares the value of ALLOC CNT with a programmable instantaneous threshold value, and indicates via the INST THR signal terminal when ALLOC CNT is less than that threshold. To program the instantaneous threshold, the adapter manager 211 writes the threshold value into the fullness detector 402. The fullness detector 402 compares the value of ALLOC CNT with the threshold value in a known fashion. When the value of ALLOC CNT exceeds the threshold value, the fullness detector 402 asserts INST THR; otherwise, INST THR is deasserted. When the ring entry mover 403 copies ring entries from the NET RCV ring to the HOST XMT ring, it writes the value of INST THR from the fullness detector 402 into the ITHR bit 313 of the ring entries 306. When set, the ITHR bit 313 indicates that the occupancy of the pages 305 in packet buffer memory 200 exceeds the programmed threshold when the packet memory controller 203 is processing that packet. Later, when the CPU 101 processes the packet and reads the ITHR bit 313, it discovers that the instantaneous threshold value was exceeded when that packet arrived. In response, the CPU 101 quickly takes congestion control actions to avoid packet loss.

In addition to providing an indication of instantaneous fullness of pages 305, the fullness detector 402 also has an Average Threshold Exceeded flag. This flag indicates when the average fullness exceeds an average threshold; it is updated by the adapter manager 211 in the manner described below, in reference to FIG. 11. The value of the flag is reflected on the AVG THR signal terminal of the fullness detector 402. The ring entry mover writes this value into the ATHR bit 314 of ring entries 306 in the same way that it writes the ITHR bit 313.

The operation of the packet buffer memory occupancy logic FIG. 4 during adapter manager interrupts will now be described. There are three sources of adapter manager interrupts:

1. Packet Discard, indicated by INC DISC (403, 404)
2. Discard Counter Half Full, indicated by DISC INT (401, 404)
3. Timer (sampling)

The adapter manager 211 distinguishes the timer interrupt from the other two internally, because the timer interrupt is a separate input to the adapter manager 211. For the Packet Discard and Discard Counter Half Full interrupts, there is a corresponding bit of the INT STAT signal. Each bit indicates the status of the corresponding interrupt. When a bit is set, the corresponding interrupt has occurred; when a bit is clear, the corresponding interrupt has not occurred. The assertion of either INC DISC or DISC INT causes the interrupt logic 404 to assert INT, thus interrupting the adapter manager 211.

Packet Discard is "masked" within the interrupt logic 404; that is, it may be enabled or disabled as a source of adapter manager interrupts. Masking is done in a known fashion by the use of a mask register within the interrupt logic 404, to which the adapter manager 211 writes. Assuming that Packet Discard is enabled, then the assertion of either INC DISC or DISC INT causes the interrupt logic 404 to assert INT, thus interrupting the adapter manager 211.

In response to a timer interrupt, the adapter manager updates several time-sensitive variables. This updating is described below, in reference to FIGS. 8, 9, and 11.

In response to a non-timer interrupt, the adapter manager 211 reads the value of INT STAT to determine the cause of the interrupt. Immediately after the adapter manager 211 reads the value of INT STAT, the PMC interface logic 405 clears INT and INT STAT by asserting CLR INT. The adapter manager 211 examines the value of INT STAT and executes a firmware routine that corresponds to the interrupt(s) that INT STAT indicates. The actions taken by the adapter manager 211 are described below, in reference to FIGS. 6 and 7.

In addition to the occupancy monitoring logic shown in FIG. 4, there is also firmware executed by the adapter manager 211 that works in conjunction with the logic. In particular, the adapter manager 211 provides a means for gathering the occupancy information from the hardware, and reporting that information to the CPU 101. These activities will now be described.

Information Gathering

Figures 5, 6:
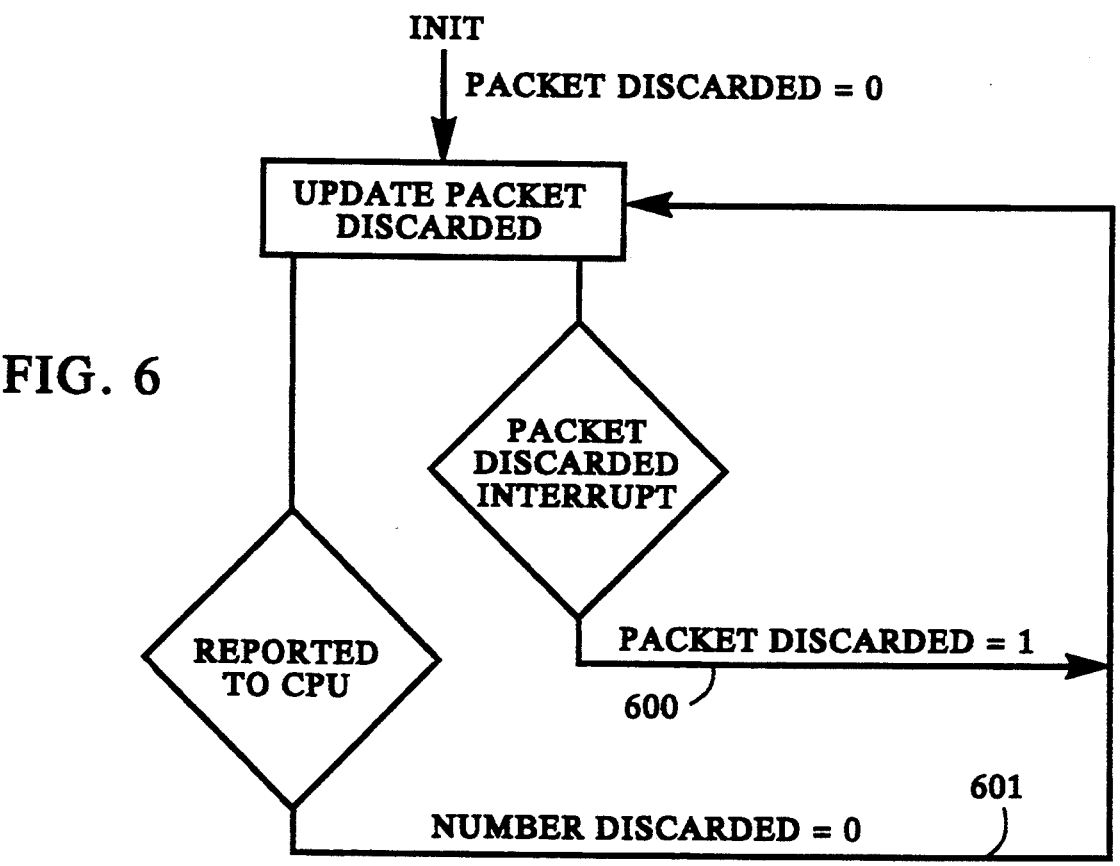
FIG. 5 is a list of occupancy-related information variables that reside in an adapter manager RAM in the adapter of FIG. 1.
FIG. 6 is a flow diagram showing how the PACKET DISCARDED variable

The adapter manager 211 gathers packet buffer memory occupancy information of two types: discard-related information, and fullness-related information. The adapter manager 211 uses several variables to store and manipulate this information. FIG. 5 is a listing of the adapter manager variables, which are kept in RAM 207. Among the discard-related variables, PACKET DISCARDED is a boolean variable that indicates whether a packet has been discarded since the last time that PACKET DISCARDED was reported to the CPU 101. INTERRUPT ON DISCARD is a boolean variable that controls whether the adapter manager 211 interrupts the CPU 101 when a packet is discarded. NUMBER DISCARDED is an approximate cumulative count of the number of packets discarded since the last time the CPU 101 read NUMBER DISCARDED. DISCARD RATE is the rate at which packets are being discarded, in packets per second. OLD NUMBER DISCARDED is a temporary variable that the adapter manager 211 uses to calculate DISCARD RATE.

Among the fullness-related variables, MAX ALLOCATED is the number of pages that are allocated for host-bound packets at initialization. ALLOCATION COUNT is the number of pages 305 that are free for use by host-bound packets. AVERAGE ALLOCATION COUNT is the average value of ALLOCATION COUNT over a recent interval, and is calculated by the adapter manager 211. INSTANTANEOUS THRESHOLD is the threshold used by the fullness detector 402 of FIG. 4 to set the INST THR signal. INSTANTANEOUS THRESHOLD is set during initialization. AVERAGE THRESHOLD is the threshold that the adapter manager 211 uses to compare with AVERAGE ALLOCATION COUNT to set the AVERAGE THRESHOLD EXCEEDED Flag in the fullness detector 402. The AVERAGE THRESHOLD EXCEEDED flag is a copy of the boolean variable AVERAGE THRESHOLD EXCEEDED. CUR CY SA and PREV CY SA are arrays of samples of the allocation counter 400, and are used to calculate the average value of the allocation counter 400. The number N of samples in CUR CY SA and PREV CY SA is set at initialization, and is calculated by dividing the maximum averaging interval by the sampling interval. CUR CY SA PTR is used to indicate where the next sample of the allocation counter should be stored within CUR CY SA. BUSY is a boolean variable that the adapter manager uses to determine the transition between averaging intervals; this use is described below in reference to FIG. 11.

FIG. 6 shows how the adapter manager 211 updates PACKET DISCARDED. PACKET DISCARDED is initialized to 0. When the adapter manager responds to the Packet Discard interrupt from the memory controller, it sets PACKET DISCARDED to 1 (branch 600 in FIG. 6). PACKET DISCARDED is cleared after it has been reported to the CPU 101, branch 601. Host reporting is discussed below in reference to FIGS. 12 through 15.

Figure 7:
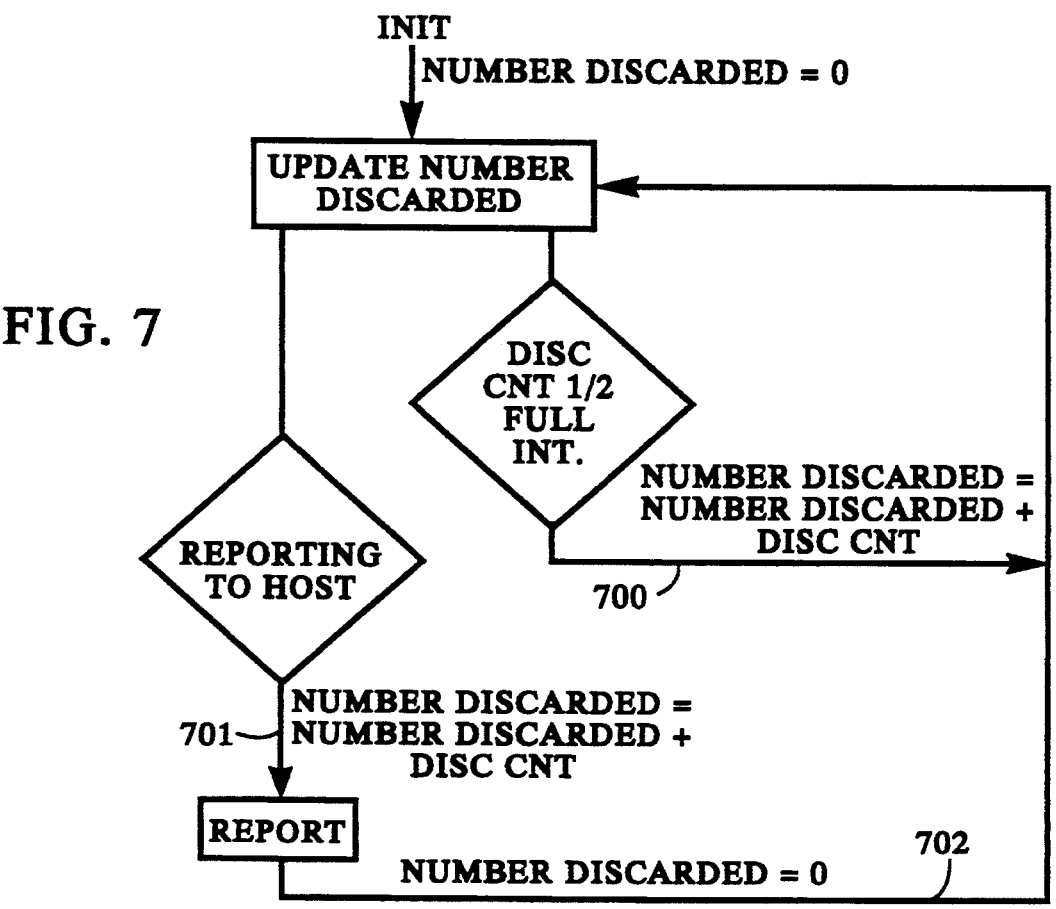
FIG. 7 is a flow diagram showing how the NUMBER DISCARDED variable

FIG. 7 shows how the adapter manager 211 updates NUMBER DISCARDED. NUMBER DISCARDED is initialized to 0. When the adapter manager responds to the Discard Counter Half Full interrupt, it reads the current value of the discard counter 401 of FIG. 4 and adds that value to the current value of NUMBER DISCARDED (branch 700). In this way, the adapter manager tracks the cumulative number of packets discarded since the last time NUMBER DISCARDED was cleared. When the adapter manager 211 reports NUMBER DISCARDED to the host (branch 701), it updates NUMBER DISCARDED again, reports the value of NUMBER DISCARDED to the host, and then sets NUMBER DISCARDED to 0 along branch 702.

Figure 8:
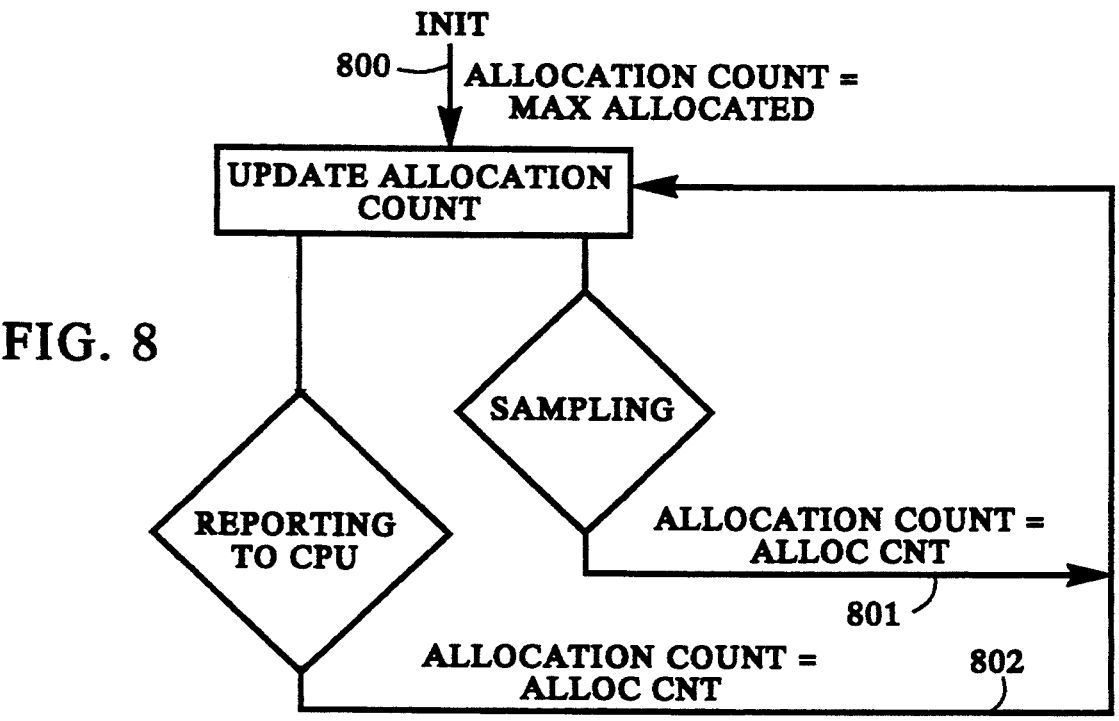
FIG. 8 is a flow diagram showing how the ALLOCATION COUNT variable

FIG. 8 shows how the adapter manager 211 updates the value of ALLOCATION COUNT. At initialization, ALLOCATION COUNT is equal to MAX ALLOCATED (branch 800). Along branch 801, the adapter manager 211 periodically samples the value of the allocation counter 400 of FIG. 4 and stores its value in ALLOCATION COUNT. The adapter performs the same actions when it is reporting the value of ALLOCATION COUNT to the host, along branch 802.

Figure 9:
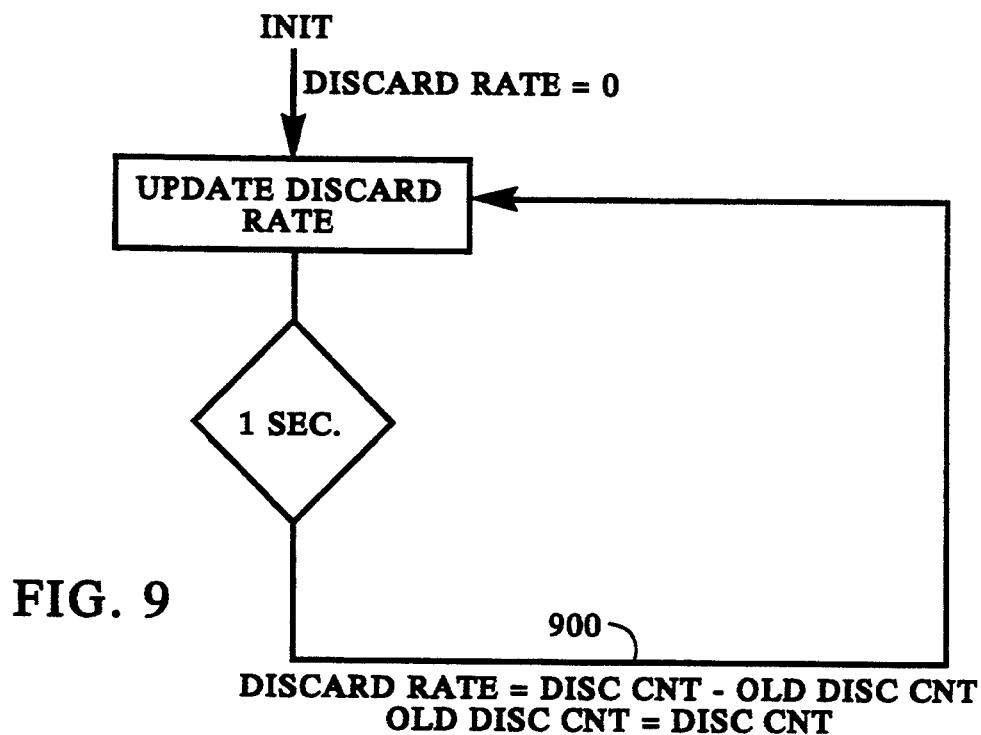
FIG. 9 is a flow diagram showing how the DISCARD RATE variable

FIG. 9 shows how the adapter manager 211 updates the value of DISCARD RATE. Once per second, the adapter manager subtracts OLD DISCARD COUNT from the current value of the discard counter 401 of FIG. 4. This is the new value of DISCARD RATE, which is the number of packets discarded per second. The adapter manager also stores the current value of the discard counter 401 in OLD DISCARD COUNT, in preparation for the next update of the DISCARD RATE. The adapter manager 211 counts timer interrupts to determine when one second has passed.

Figure 10:
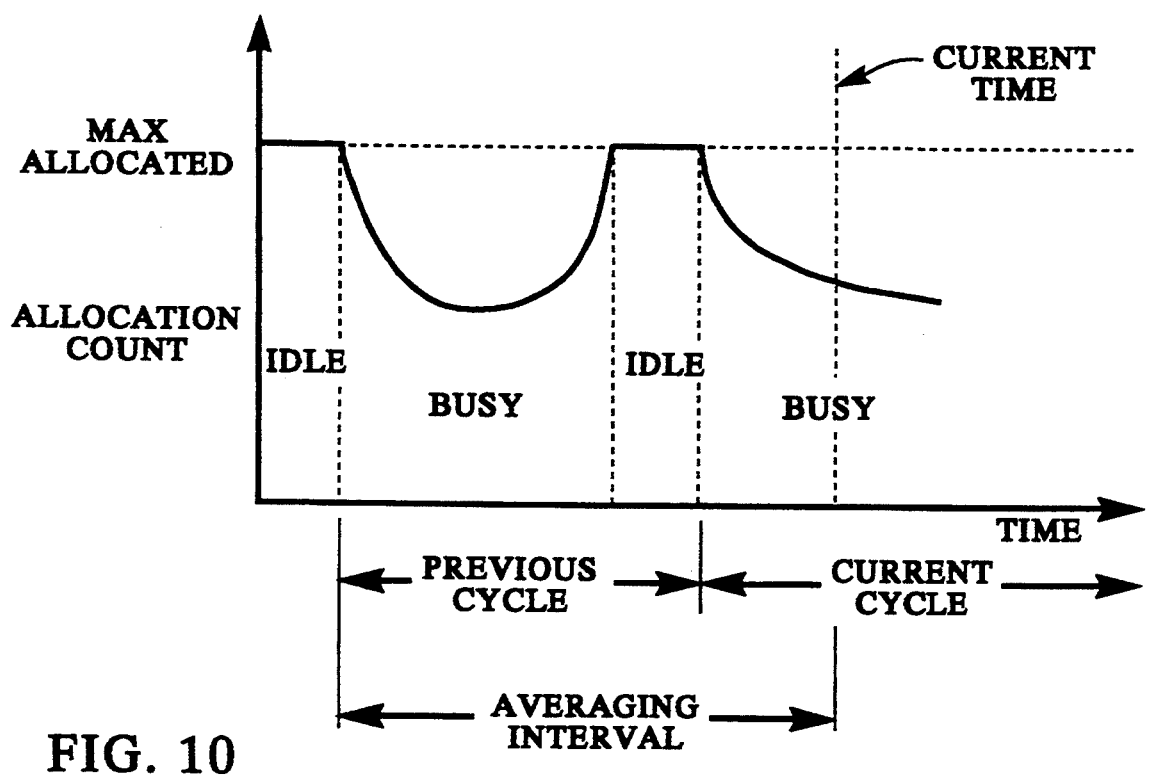
FIG. 10 is a hypothetical plot of the ALLOCATION COUNT variable FIG. 5 over time.

FIG. 10 is a hypothetical plot of ALLOCATION COUNT over a time period. As shown, the value of ALLOCATION COUNT alternates between MAX ALLOCATED and something less than MAX ALLOCATED. These alternate states are shown as IDLE and BUSY, respectively. The combination of a BUSY period and a succeeding IDLE period is called a "cycle".

The value of ALLOCATION COUNT is averaged over an averaging interval. This is done by summing samples of ALLOCATION COUNT over the averaging interval and then dividing the sum by the number of samples taken during the averaging interval. The averaging interval may be a fixed time interval, or the time period between the beginning of the previous cycle and the current time, as shown in FIG. 10. When the averaging interval of FIG. 10 is used, the averaging is known as adaptive averaging, because the length of the interval varies according to the occupancy of the packet buffer memory 200. Adaptive averaging is described in "A Binary Feedback Scheme for Congestion Avoidance in Computer Networks" by K. K. Ramakrishnan and Raj Jain, ACM Transactions on Computer Systems, Vol. 8, No. 2, May 1991.

Figure 11:
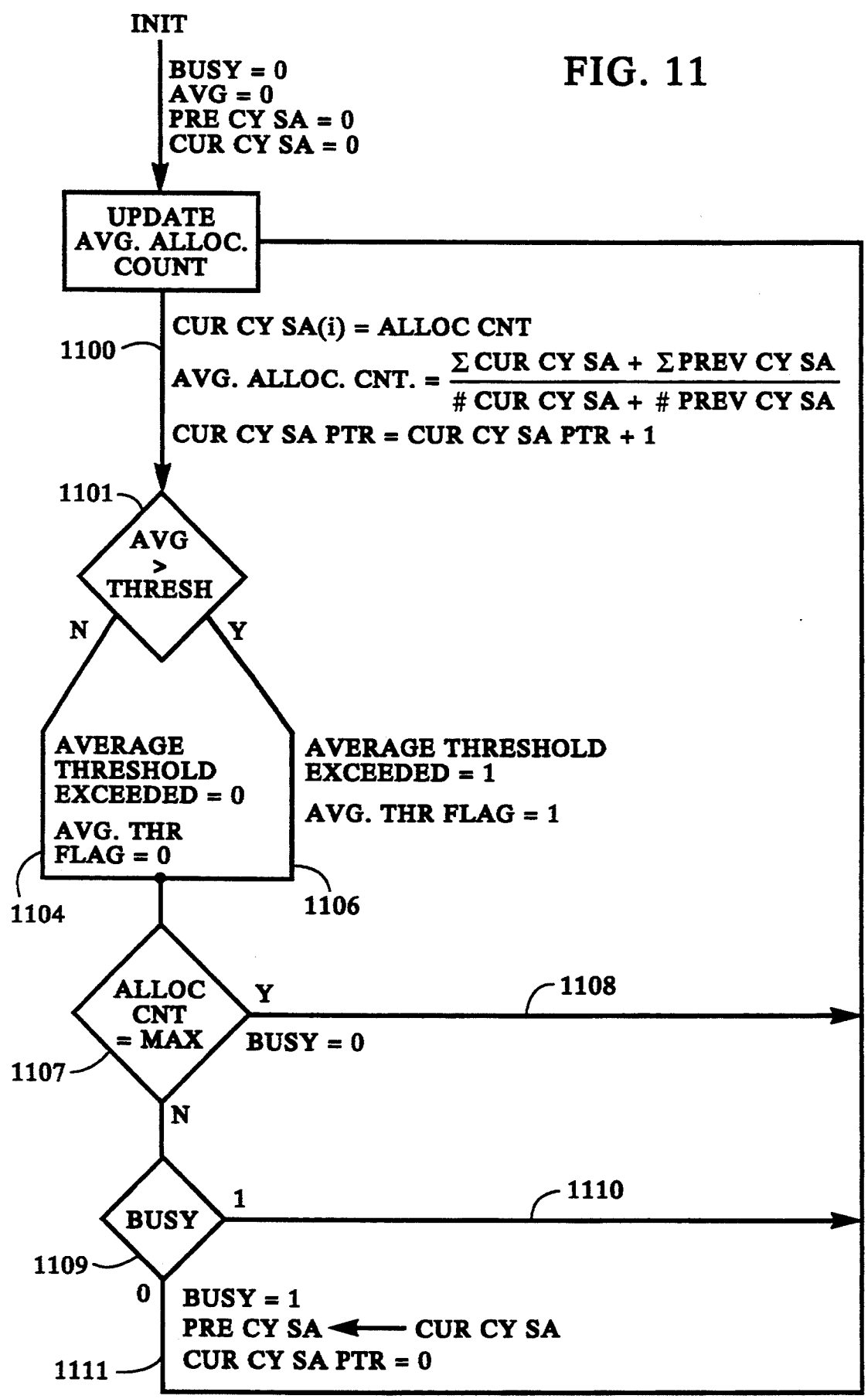
FIG. 11 is a flow diagram showing how averaging of the ALLOCATION COUNT variable

FIG. 11 illustrates the method that the adapter manager 211 uses to calculate AVERAGE ALLOCATION COUNT when using adaptive averaging. The steps shown in FIG. 11 are executed once per sample. Along branch 1100, the adapter manager 211 first reads the value of ALLOC CNT from the allocation counter 400 and stores it in the CUR CY SA array at the location given by CUR CY SA PTR. The adapter manager 211 then calculates the new value of AVERAGE ALLOCATION COUNT as follows:

1. Add the summation of all CUR CY SA values to the summation of all PREV CY SA values.
2. Divide the result of step 1 by the sum of the number of CUR CY SA values and the number of PREV CY SA values.

Finally, along branch 1100, the CUR CY SA PTR is incremented in preparation for the next sample.

After calculating the new average, the adapter manager 400 checks whether the new value of AVERAGE ALLOCATION COUNT exceeds AVERAGE THRESHOLD at 1101. If not, it clears AVERAGE THRESHOLD EXCEEDED at 1104. If so, it sets AVERAGE THRESHOLD EXCEEDED to one at 1106. Along either branch 1104 or branch 1106, the adapter manager also updates the value of the Average Threshold Exceeded flag in the fullness detector 402 if the value of AVERAGE THRESHOLD EXCEEDED changes during the current sample.

After checking the new average against the threshold, the adapter manager 211 determines whether the current cycle has ended and a new one begun. It does this by monitoring ALLOCATION COUNT and BUSY. If the ALLOCATION COUNT equals MAX ALLOCATED (step 1107), then the adapter 103 is currently in an IDLE period as shown in FIG. 10. In that case, the adapter manager 211 clears BUSY (branch 1108), indicating that the adapter 103 currently has no packets for delivery to the CPU 101. If ALLOCATION COUNT does not equal MAX ALLOCATED, then there are packets to be delivered, and the adapter manager 211 proceeds to examine BUSY in step 1109. If BUSY is set (branch 1110), the adapter 103 is in the middle of a cycle, so there is nothing else to do during the sampling interrupt. If BUSY is not set (branch 1111), this is the beginning of a new cycle. In this case, the adapter manager 211 sets BUSY, transfers the CUR CY SA values to PREV CY SA, and clears CUR CY SA PTR.

Information Reporting

The adapter manager 211 is responsible for reporting the occupancy information that it gathers to the CPU 101. To do this, the adapter manager 211 employs three message-passing schemes. Two schemes rely on ring structures in the host memory 102 that function the same way that the NET RCV ring 302 and the HOST XMT ring 303, previously described, function. In the third scheme, the adapter manager 211 writes network-related variables to an area of host memory 102 that is used for saving the variables during a reset of the adapter 103.

The rings in host memory 102 are called the COMMAND and UNSOLICITED rings, and their general operation is briefly described. The COMMAND ring is used to transfer commands from the CPU 101 to the adapter manager 211, and to transfer command responses from the adapter manager 211 back to the CPU 101. When the CPU 101 wishes to send a command to the adapter manager 211, it stores the command data into a page of host memory 102. If the CPU 101 expects data from the adapter manager 211 in response to the command, the CPU 101 also stores the address of a page of host memory 102 where the response should go. The CPU 101 then writes the address of the command page, and other descriptive information, into a COMMAND ring entry in host memory 102. It then toggles the OWN bit 307 to indicate that the adapter manager 211 owns the ring entry. Finally, the CPU 101 interrupts the adapter manager 211 to indicate that there is a new command.

In response to the interrupt, the adapter manager 211 reads the ring entry to determine the address of the command page, and then reads the command page. After executing the command, it stores any response data back in the command page, toggles the OWN bit 307 of the ring entry, and interrupts the CPU 101 to indicate that the command processing is complete. The CPU 101 is then free to examine the response, and also to re-use the ring entry and command page.

The UNSOLICITED ring allows the adapter manager 211 to send unsolicited messages to the CPU 101. When the adapter manager 211 wishes to send an unsolicited message to the CPU 101, it stores the message data in an UNSOLICITED ring entry in host memory 102. It then toggles the OWN bit 307 to indicate that the CPU 101 owns the ring entry. Finally, the adapter manager 211 interrupts the CPU 101 to indicate that there is a new unsolicited message. In response to the interrupt, the CPU 101 reads the message data from the ring entry in host memory 102. After it has read the data, the CPU 101 toggles the OWN bit 307, so that the adapter manager 211 can re-use the ring entry later.

Figure 12:
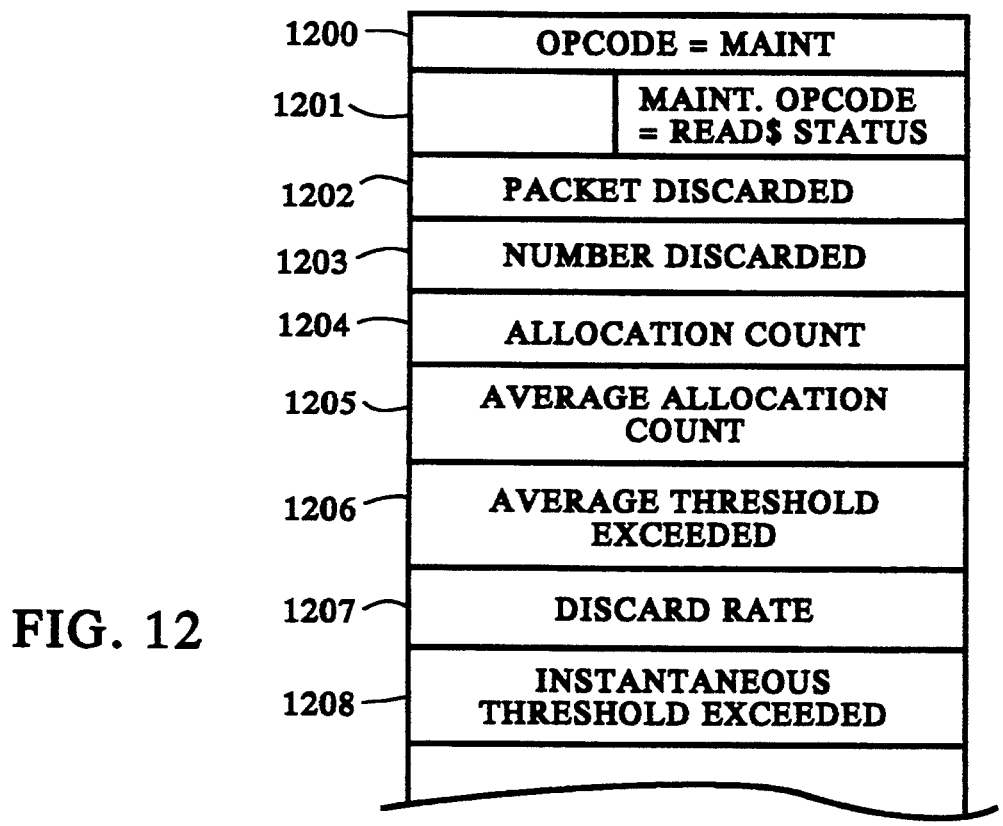
FIG. 12 shows the format of a Read$Status command that the CPU of FIG. 1 issues to the adapter FIG. 1.

The CPU 101 uses the COMMAND ring when it wants the adapter manager 211 to perform a task. In particular, the CPU 101 issues a Read$Status maintenance command on the COMMAND ring to tell the adapter manager 211 to report packet buffer memory occupancy information. The format of the command page is shown in FIG. 12. Each line in FIG. 12 represents a 32-bit value called a "longword" of host buffer memory. At the base address of the command page is the opcode longword 1200, in this case having the value MAINT (this is a mnemonic value; the actual binary value is not important). There are many other opcodes for other commands that are not described here, because they are not relevant to the implementation of the invention. Within the next longword 1201 is a 16-bit maintenance opcode, in this case Read$Status. The remainder of the command page is reserved for the adapter to store the data shown in FIG. 12. There is a longword each for PACKET DISCARDED 1202, NUMBER DISCARDED 1203, ALLOCATION COUNT 1204, AVERAGE ALLOCATION COUNT 1205, AVERAGE THRESHOLD EXCEEDED 1206, DISCARD RATE 1207, and INSTANTANEOUS THRESHOLD EXCEEDED 1208.

Figure 13:
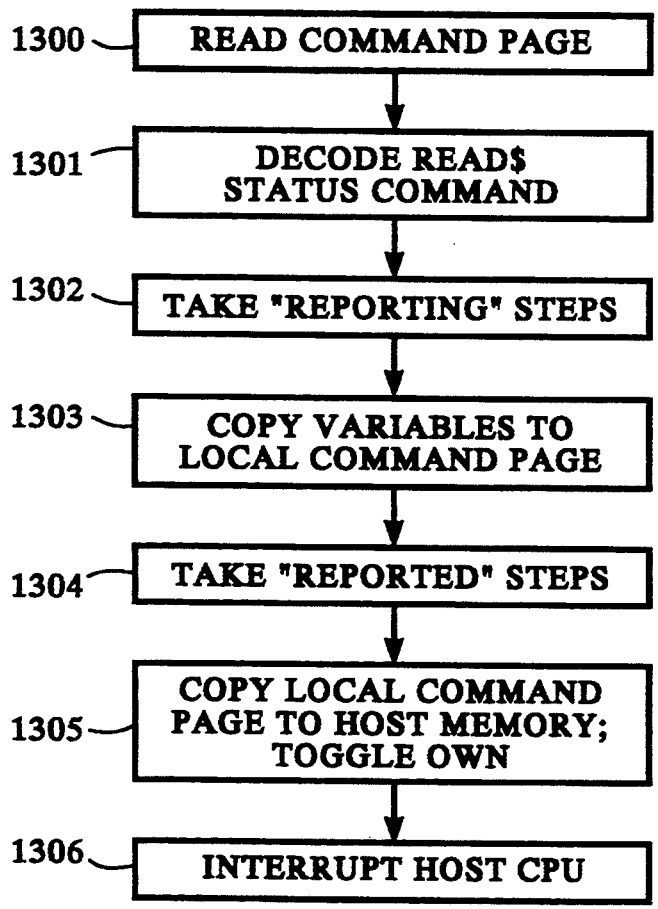
FIG. 13 is a flow diagram showing how the adapter of FIG. 1 processes the Read$Status command FIG. 11.

The adapter manager 211 processes the Read$Status as shown in FIG. 13. The steps shown in FIG. 13 are performed after the adapter manager 211 has received the interrupt from the host that indicates that there is a new entry on the COMMAND ring.

At step 1300, the adapter manager 211 reads the command page into RAM 207, so it has a local copy to work on. It then decodes the Read$Status command in step 1301. At 1302, it takes the "reporting" steps 701 and 802 shown in FIGS. 7 and 8, which entail reading the allocation counter 400 and discard counter 401, and updating ALLOCATION COUNT and NUMBER DISCARDED. In step 1303, the adapter manager copies the required variables (1202 through 1208 in FIG. 12) into the local copy of the command page. Then, at 1304, the adapter manager takes the "reported" steps 601 and 702 of FIGS. 6 and 7, which entail clearing PACKET DISCARDED and NUMBER DISCARDED.

At this point, the adapter manager's RAM 207 has a copy of the response to the Read$Status command. The adapter manager 211 then copies this data back into the COMMAND page in host memory 102, and toggles the OWN bit 307 in the COMMAND ring entry (step 1305). Finally, the adapter manager 211 signals that the response is ready by interrupting the CPU 101 in step 1306. The CPU 101 is now free to read the response data from the COMMAND page.

Figure 14:
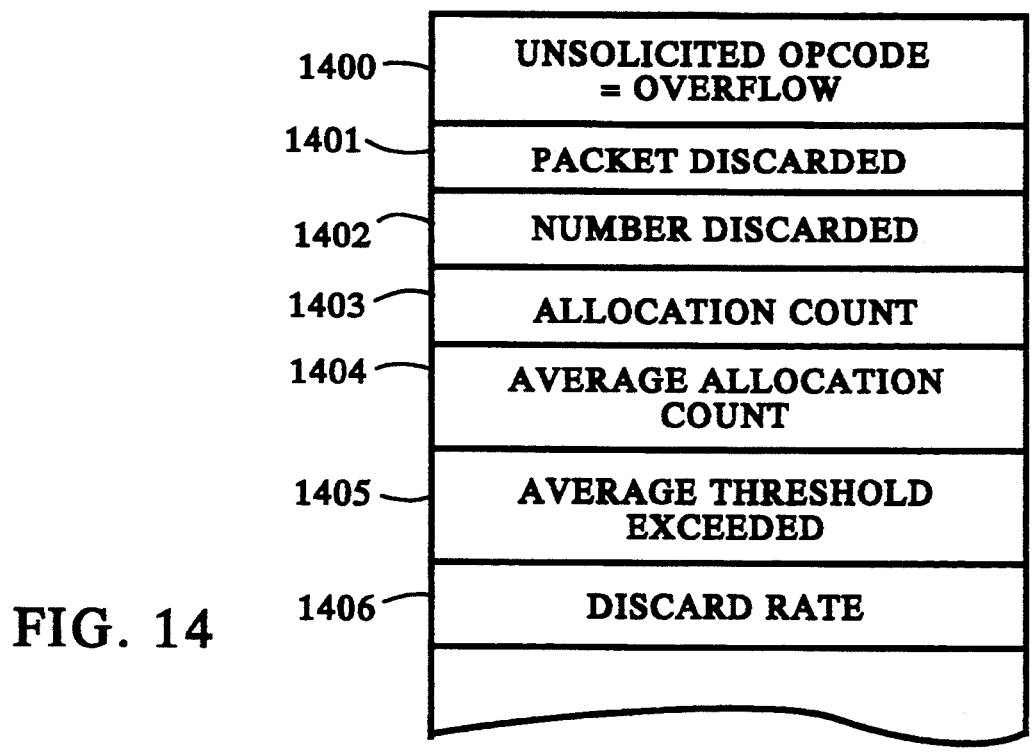
FIG. 14 shows the format of an unsolicited Overflow message that the adapter FIG. 1 sends to the CPU of FIG. 1.

The adapter manager 211 also sends unsolicited messages to the CPU 101 via the UNSOLICITED ring in host memory 102. When the INTERRUPT ON DISCARD variable is set, the adapter manager 211 sends an unsolicited message every time it takes a Packet Discarded interrupt. The format of the unsolicited message is shown in FIG. 14. It is very similar to the command message format of FIG. 12; the only difference is that there is an unsolicited opcode of Overflow at longword 1400. The adapter manager 211 constructs longwords 1401 through 1406 in the same fashion as it does longwords 1202 through 1208 of the command page, shown in FIG. 12. After the unsolicited message is constructed, it is delivered to the UNSOLICITED ring in host memory 102. When the CPU 101 reads PACKET DISCARDED from the ring entry, it learns that a packet has been discarded due to the fullness pages 305.

In addition to the command and unsolicited messaging described above, there is also a way for the adapter manager 211 to write the value of the discard counter 401 to an area of host memory 102 that is used for saving variables during a reset of the adapter 103. This mechanism is used, for example, when power to the adapter 103 is lost, but not power to the host memory 102. When the power is restored, the adapter can re-initialize the discard counter 401 and other variables by reading their saved values from host memory.

Figure 15:
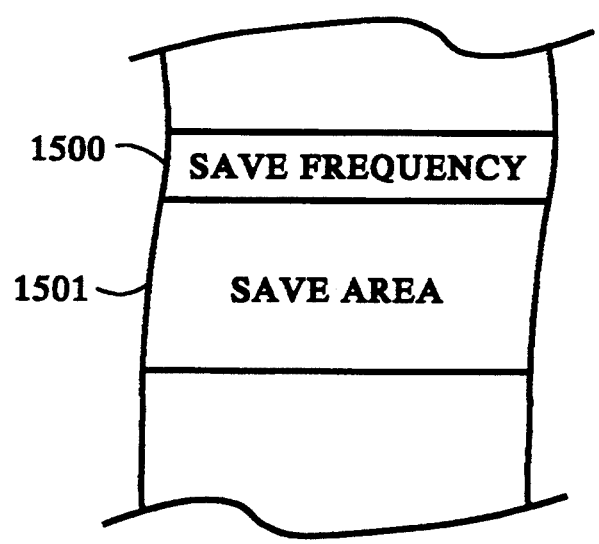
FIG. 15 shows the format of an area of the host memory of FIG. 1 that is used for saving information when the adapter of FIG. 1 is reset.

The structure of the variable-saving area in host memory 102 is shown in FIG. 15. There is a save interval 1500 and a save area 1501. The save interval 1501 tells the adapter manager how often to save the value of the discard counter 401. The save interval 1501 indicates the number of timer interrupts that the adapter manager should count between sequential saves of the discard counter 401. If the timer interrupt period is 10 milliseconds, then the interval between saves may range from 10 milliseconds to several hours or days. To save the value of the discard counter 401, the adapter manager 211 reads the discard counter 401 over the MCTL bus 212 and then writes the value into the save area 1501.

When the CPU 101 re-initializes the adapter 103, the adapter reads the saved value of the discard counter 401 from the save area 1501 and stores that value into the discard counter 401. Therefore, when the adapter 103 resumes operation on the network, it starts with an approximate value of the number of packets discarded in a recent interval. This allows the node 100 to resume network activity with a minimum of disruption.

The use of the above-described technique for saving the value of the discard counter 401 during a reset is not restricted to only network devices. It may also be used by a disk controller to save the value of various counters, such as error counters or counters that count the number of read or write operations. When such a disk controller is reset, the disk controller loses this information. So the saving technique allows the disk controller to recover this information, and to make it available to the CPU 101.

The saving technique may also be used, for example, by an I/O controller to save state information about an attached device. When the device is re-initialized, the I/O controller can read the saved information from memory instead of either re-creating the information from scratch or re-reading it from the attached device. By so doing, the I/O controller reduces the amount of time taken for initialization.

What is claimed is:

1. A network node comprising:
   a host computer;
   a network adapter including a packet buffer memory, said packet buffer memory including a plurality of pages for storing packet data, means for monitoring the occupancy of said packet buffer memory, said monitoring means generating packet buffer memory occupancy information, said packet buffer memory occupancy information including packet discard-related information and packet buffer memory fullness-related information, and packet transfer managing means, said packet transfer managing means for managing said pages of said packet buffer memory as said pages are used to move said packet data from said network to said host computer and for providing said packet buffer memory occupancy information to said host computer when said packet data is transferred from said packet buffer memory to said host computer; and
   means for reporting said packet buffer memory occupancy information to said host computer, said means for reporting including a host bus coupling said network adapter to said host computer, a first message-passing mechanism for transferring commands from said host computer to said network adapter to request said occupancy information and responses from said network adapter to said host computer and a second message-passing mechanism for transferring unsolicited messages regarding occupancy information from said network adapter to said host computer, said reporting means and said packet transfer managing means of said network adapter reporting said occupancy information independently.

2. A network node as in claim 1, wherein said packet transfer managing means resides in said packet buffer memory, said packet transfer managing means further comprising:
   a NET RCV ring, a shared data structure having a plurality of ring entries pointing to a first set of pages selected from said plurality of pages, said first set of pages holding data from one or more packets received from a network; and
   a HOST XMT ring, a shared data structure having a plurality of ring entries pointing to a second set of pages selected from said first set of pages, said second set of pages holding data to be delivered to said host computer.

3. A network node as in claim 2, wherein each of said plurality of ring entries of said HOST XMT ring further comprises an instantaneous threshold exceeded (ITHR) bit to indicate to said host computer that the instantaneous occupancy of said second set of pages exceeds an instantaneous threshold, said instantaneous threshold being a predetermined instantaneous fullness level of said packet buffer memory.

4. A network node as in claim 2, wherein each said plurality of ring entries of said HOST XMT ring further comprises an average threshold exceeded (ATHR) bit to indicate to said host computer that the average occupancy of said second set of pages over an averaging interval exceeds an average threshold, said average threshold being a predetermined average fullness level of said packet buffer memory.

5. A network node as in claim 1, wherein said network adapter further comprises a means for asserting a discard signal when said network adapter discards a packet, and wherein said occupancy monitoring means comprises:
   an allocation counter that generates an allocation count, said allocation count being the number of free ones of said plurality of pages;
   a fullness detector, responsive to said allocation count, that detects when the number of full ones of said plurality of pages exceeds an instantaneous threshold, said number of full ones of said plurality of pages being the difference between the number of said plurality of pages and said number of free once of said plurality of pages, said instantaneous threshold being a predetermined instantaneous fullness level of said packet buffer memory;
   a discard counter that generates a discard count and a discard interrupt, said discard count being incremented when said discard signal is asserted, said discard interrupt being asserted when said discard counter is at least half full;
   an average-threshold-exceeded flag, said average-threshold being a predetermined average fullness level of said packet buffer memory;
   an adapter manager;
   an interrupt block that generates an interrupt signal for interrupting said adapter manager, said interrupt signal being asserted when said discard signal is asserted, said interrupt signal also being asserted when said discard interrupt is asserted; and
   means for allowing said adapter manager to access said allocation counter, said fullness detector, said discard counter, and said interrupt logic.

6. A network node as in claim 1, wherein said means of reporting further includes an adapter manager in said network adapter, a datapath between said adapter manager and said host bus, and said first message-passing mechanism of said reporting means includes a COMMAND ring and said second message-passing mechanism of said reporting means includes an UNSOLICITED ring, said adapter manager for utilizing said COMMAND ring in receiving and responding to host commands over said datapath and for utilizing said UNSOLICITED ring in sending unsolicited messages over said datapath to said host computer.

7. A data transmission system having a data transmission network and at least one host computer comprising:
   a network adapter, said network adapter including a packet buffer memory coupled to said network to store data packets received from said network, means for transferring said data packets from said packet buffer memory to said host computer and means for notifying said host computer when the occupancy of said packet buffer memory exceeds a threshold value, said means for notifying including a means for setting an average threshold exceeded bit in a data word associated with one of said data packets to be delivered to said host computer, said average threshold being a predetermined average fullness level of said packet buffer memory, and a means for setting an instantaneous threshold exceeded bit in a data word associated with one of said data packets to be delivered to said host computer, said instantaneous threshold being a predetermined instantaneous fullness level of said packet buffer memory; and means for reporting packet buffer memory occupancy information to said host computer, said packet buffer memory occupancy information including packet discard-related information or packet buffer memory fullness-related information, said means for reporting including a host bus coupling said network adapter to said host computer, a first message-passing mechanism for transferring commands from said host computer to said network adapter to request said occupancy information and responses from said network adapter to said host computer and a second message-passing mechanism for transferring unsolicited messages regarding occupancy information from said network adapter to said host computer, said reporting means communicating said occupancy information independently of said notifying means.

8. A network adapter according to claim 7, wherein said packet buffer memory is organized as a plurality of fixed-size pages, and wherein said notifying means further comprises:

an allocation counter to store an allocation count of the number of said pages of said packet buffer memory that may be used to store said data packets, said allocation counter initialized to an initial allocation count, said allocation counter decremented upon receipt of said data packets and incremented upon delivery of said data packets to said host computer; and a fullness detector coupled to said allocation counter to compare said allocation count to said threshold value.

9. A network adapter according to claim 7, further comprising:

means for discarding one of said data packets when said one of said data packets is received and said packet buffer memory has insufficient free space to store said one of said data packets;

a discard counter to store a discard count of the number of said data packets that are discarded; and means for reporting a discard count of a cumulative number of said data packets that are discarded to said host computer.

10. A network adapter according to claim 9, further comprising:

means for updating a NUMBER DISCARDED variable when the value of said discard count crosses a discard threshold and reporting the updated value of said NUMBER DISCARDED variable to said host computer.

11. A network adapter according to claim 10, wherein said discard threshold is a predetermined proportion of a maximum discard count value.

12. A method of operating a data transmission system having a host computer and a data packet transmission network coupled to said host computer by a network adapter for receiving data packets from said network, comprising the steps of:

receiving said data packets from said network;

storing said data packets in a packet buffer memory;

discarding each of said stored data packets that is received when said packet buffer memory has insufficient space available allocated for storage of host-destined data packets;

transferring undiscarded ones of said data packets stored in said packet buffer memory to said host computer;

monitoring the occupancy of said packet buffer memory during transmission of said data packets to generate packet buffer memory occupancy information, said step of monitoring including the step of counting the number of discarded ones of said data packets, or determining an occupancy level of said packet buffer memory and comparing said occupancy level of said packet buffer memory to a threshold value; and reporting said packet buffer memory occupancy information to said host computer, said packet buffer memory occupancy information including the number of discarded ones of said data packets or data indicating said occupancy level of said packet buffer memory exceeds said threshold value, said reporting step including transferring commands from said host computer to said network adapter to request said occupancy information and responses from said network adapter to said host computer, transferring unsolicited messages regarding occupancy information from said network adapter to said host computer of providing said occupancy information to said host computer when said data packet is transferred from said packet buffer memory to said host computer.

13. A method according to claim 12, wherein said packet buffer memory is organized as a plurality of fixed-sized pages and wherein said determining step comprises the steps of:

initializing an allocation counter to an initial allocation count of the number of said pages that may be used to store said data packets;

decrementing said allocation counter upon receipt of said data packets; and incrementing said allocation counter upon delivery of said data packets to said host computer.

14. A method according to claim 12, wherein said occupancy level is an average occupancy level over an interval, said average occupancy level being a level of average fullness of said packet buffer memory.

15. A method according to claim 12, wherein said occupancy level is an instantaneous occupancy level, said instantaneous occupancy level being a level of fullness of said packet buffer memory at a specific instant.

* * * * *